United States Patent
Huang et al.

(10) Patent No.: US 6,262,168 B1
(45) Date of Patent: *Jul. 17, 2001

(54) AQUEOUS DISPERSIONS

(75) Inventors: Sun-Yi Huang, Stamford; Joseph J. Kozakiewicz, Trumbull, both of CT (US); Louis Rosati, South Salem, NY (US)

(73) Assignee: Cytec Technology Corp., Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/038,764

(22) Filed: Mar. 11, 1998

(51) Int. Cl.$^7$ ........................................ C08J 3/10
(52) U.S. Cl. ................ 524/521; 524/401; 524/416; 524/417; 524/419; 524/423; 524/436; 524/456; 524/458; 524/460; 524/519; 524/522
(58) Field of Search ............... 524/458, 460, 524/521, 522, 401, 416, 417, 419, 423, 436, 456, 519

(56) References Cited

U.S. PATENT DOCUMENTS

| | | | |
|---|---|---|---|
| 3,234,163 | 2/1966 | Schurtz et al. | 260/29.6 |
| 4,380,600 | 4/1983 | Hosoda et al. | 524/458 |
| 4,522,968 | 6/1985 | Horacek | 524/388 |
| 4,673,704 | 6/1987 | Flesher et al. | 524/519 |
| 4,699,951 | 10/1987 | Allenson et al. | 525/194 |
| 4,778,836 | 10/1988 | Farrar et al. | 524/35 |
| 4,835,206 | 5/1989 | Farrar et al. | 524/457 |
| 4,929,655 | 5/1990 | Takeda et al. | 524/458 |
| 5,006,590 | 4/1991 | Takeda et al. | 524/458 |
| 5,045,587 | 9/1991 | Tanaka | 524/310 |
| 5,130,358 | 7/1992 | Danner | 524/140 |
| 5,213,693 | 5/1993 | McGrow et al. | 210/728 |
| 5,330,650 | 7/1994 | Byrne et al. | 210/708 |
| 5,403,883 | 4/1995 | Messner et al. | 524/458 |
| 5,480,934 | 1/1996 | Messner et al. | 524/458 |
| 5,498,678 | 3/1996 | Steffier | 526/200 |
| 5,587,415 | 12/1996 | Taeda | 524/458 |
| 5,597,858 | 1/1997 | Ramesh et al. | 524/458 |
| 5,597,859 | 1/1997 | Hurlock et al. | 524/458 |
| 5,614,602 | 3/1997 | Connors et al. | 526/307.3 |
| 5,696,228 | 12/1997 | Coville | 528/502 E |
| 5,708,071 | 1/1998 | Takeda | 524/458 |
| 5,750,034 | 5/1998 | Wong Shing et al. | . |
| 5,840,804 | * 11/1998 | Carl et al. | 524/555 |
| 5,938,937 | * 8/1999 | Sparapany et al. | 210/728 |
| 5,961,838 | 10/1999 | Braden et al. | 210/728 |
| 6,001,920 | 12/2000 | Ghafoor et al. | 524/500 |
| 6,025,426 | 2/2000 | Hurlock | 524/458 |
| 6,031,037 | 2/2000 | Ghafoor et al. | 524/388 |
| 6,036,868 | 3/2000 | Sivakumar et al. | 210/708 |
| 6,059,930 | 5/2000 | Wong Shing et al. | 162/168.2 |

FOREIGN PATENT DOCUMENTS

| | | |
|---|---|---|
| 0 183 466 B1 | 8/1990 | (EP) . |
| 0 525 751 A1 | 2/1993 | (EP) . |
| 0 630 909 A1 | 12/1994 | (EP) . |
| 0 717 056 A2 | 6/1996 | (EP) . |
| 0 805 234 A2 | 11/1997 | (EP) . |
| 0 821 099 A1 | 1/1998 | (EP) . |
| 0 831 177 A2 | 3/1998 | (EP) . |
| 0 839 767 A2 | 5/1998 | (EP) . |
| 52-71392 | 6/1977 | (JP) . |
| 2-38131 | 1/1987 | (JP) . |
| 6-22540 | 2/1994 | (JP) . |

OTHER PUBLICATIONS

Polymer Bulletin 16 (1986) Springer–Verlag 1986, Minodora Leca, pp. 537–543.

Chemical Engineering Progress, Apr. 1996, "Successfully Use Agglomeration for Size Enlargement," Wolfgang Pietsch, pp. 29–45.

Power And Bulk Engineering, Feb. 1996, Speeding up continuous mixing agglomeration with fast agitation and short residence times, Peter Koenig, pp. 67–84.

Journal Of Polymer Science: Part A–1, vol. 7, "Salt Effect on Polymer Solutions," Shuji Saito, Momotani Juntenkan, Ltd., Mlnatoku, Osaka, Japan, pp. 1789–1802.

* cited by examiner

Primary Examiner—Judy M. Reddick
(74) Attorney, Agent, or Firm—Knobbe, Martens, Olson & Bear, LLP

(57) ABSTRACT

Aqueous dispersions of cationic water-soluble polymers are provided, as well as processes for making and methods of using the same. The cationic polymers contain anionic recurring units in amounts that encourage the formation of the aqueous dispersion and/or advantageously reduce the bulk viscosity of the aqueous dispersion.

11 Claims, No Drawings

AQUEOUS DISPERSIONS

BACKGROUND OF THE INVENTION

This invention relates to aqueous dispersions comprised of water-soluble and/or water-swellable copolymers, processes for making said dispersions, and methods of using said dispersions in water treating, dewatering, water clarification, papermaking, oil field, soil conditioning, food processing, mineral processing, and biotechnological applications.

Aqueous dispersions of water-soluble and water-swellable polymers are known, see generally e.g. U.S. Pat. No. 5,696,228, which is hereby incorporated herein by reference, and references therein. In this regard may also be mentioned U.S. Pat. No. 5,708,071 and EP 0 717 056 A2, which disclose aqueous dispersions of amphoteric polymers. Aqueous dispersions typically consist of a discontinuous polymer-containing phase and a continuous aqueous phase. The discontinuous phase may contain water and generally contains a water-soluble or water-swellable polymer, and the continuous aqueous phase usually contains a different water-soluble polymer and/or salt. Despite efforts to make satisfactory aqueous dispersions, the problem remains of producing aqueous dispersions of water-swellable and high molecular weight water-soluble polymers that have advantageously low bulk viscosities, high active solids content, minimal quantities of dilutive material, and that dissolve readily and can be prepared with a broad range of cationicity.

SUMMARY OF THE INVENTION

This problem is solved in the present invention by providing novel aqueous dispersions of high molecular weight water-soluble or water-swellable polymers, as well as processes for making and methods of using said aqueous dispersions. Accordingly, an aqueous dispersion of polymers is provided which comprises (a) a first cationic water-soluble or water-swellable polymer comprised of cationic recurring units and anionic recurring units; and (b) at least one second water-soluble polymer different from said first polymer, wherein the amounts of said (a) and said (b) are such that a homogeneous composition is obtained in the absence of said (b).

Processes for making aqueous dispersions are also provided, e.g. a process which comprises copolymerizing a mixture of monomers comprised of cationic vinyl-addition monomer and anionic vinyl-addition monomer to form a first cationic water-soluble or water-swellable polymer which contains bulk viscosity-reducing amounts of anionic recurring units, wherein said polymerizing is carried out in the presence of a dispersion-creating amount of at least one second water-soluble polymer different from said first polymer.

Methods of using aqueous dispersions to treat suspended solids are also provided e.g. a method for dewatering a suspension of dispersed solids which comprises intermixing an aqueous dispersion of polymers, or aqueous admixture thereof, in an amount effective for dewatering, with a suspension of dispersed solids, and dewatering said suspension of dispersed solids, wherein said aqueous dispersion of polymers is comprised of (a) a first cationic water-soluble or water-swellable polymer comprised of cationic recurring units and anionic recurring units; and (b) at least one second water-soluble polymer different from said first polymer, in which the amounts of said (a) and said (b) are such that a homogeneous composition is obtained in the absence of said (b).

DETAILED DESCRIPTION OF PREFERRED EMBODIMENTS

The aqueous dispersions of the instant invention are generally comprised of a discontinuous phase of small aqueous droplets, containing polymer that is comprised predominately of a first cationic water-soluble or water-swellable polymer, that are dispersed in an aqueous continuous phase, although of course minor amounts of said first polymer may be found in the continuous phase. Typically more than 50%, preferably more than 75%, of the polymer in a typical small aqueous droplet is the first cationic water-soluble or water-swellable polymer. The amount of first cationic polymer in the discontinuous and continuous phases may be determined by known analytical techniques e.g. Raman microscopy.

The first cationic water-soluble or water-swellable polymer may be a condensation polymer or an addition polymer, preferably a vinyl-addition polymer. The cationic charge of said first cationic polymer may vary over a broad range by containing from about 1% to about 99.9% cationic recurring units, preferably about 5% or greater, more preferably about 10% or greater, even more preferably about 20% or greater, most preferably about 30% or greater, preferably about 90% or less, more preferably about 80% or less, most preferably about 70% or less, by mole based on total moles of recurring units in said first cationic polymer. Cationic recurring units may be formed by post-reaction of polymer, but are preferably formed by polymerization of cationic monomers. Cationic monomers may include any cationic monomer, including diallyidialkylammonium halide, cationic (meth) acrylates, and cationic (meth)acrylamides commonly used in preparing water-soluble polymers, preferably diallyidimethylammonium halide, as well as acid and quaternary salts of dialkylaminoalkyl(alk)acrylate and dialkylaminoalkyl (alk)acrylamide. Cationic recurring units may be formed by the polymerization of quaternizable monomers such as dialkylaminoalkyl(alk)acrylate or dialkylaminoalkyl(alk) acrylamide, followed by acidification or quaternization. Most preferably, the first cationic polymer contains cationic recurring units of the formula (I), preferably formed by polymerization of the corresponding monomers of the formula (II):

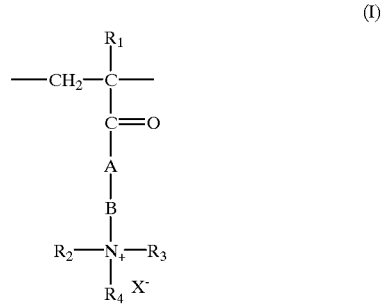

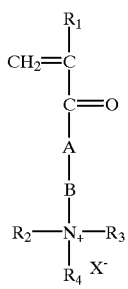

(II)

wherein $R_1$ is H or $CH_3$, A is O or NH, B is alkylene or branched alkylene or oxyalkylene having from 1 to 5 carbons, $R_2$ and $R_3$ are each individually methyl, ethyl, or propyl, $R_4$ is an alkyl group having from 1 to 10 carbon atoms, or an aryl group having from 6 to 10 carbon atoms, and X is a counterion. In more preferred embodiments, $R_2$, $R_3$ and $R_4$ together contain at least a total of 4 carbon atoms. In certain preferred embodiments, $R_4$ is a methyl, ethyl or propyl group. In other preferred embodiments, $R_4$ is an alkyl group having from 4 to 10 carbon atoms. In other preferred embodiments, $R_4$ is benzyl. Preferably, X is chloride, bromide, iodide, methylsulfate, or ethylsulfate. Recurring units of the formula (I) are even more preferably (meth)acryloyloxyethyltrimethylammonium chloride, (meth)acryloyloxyethyltrimethylammonium methyl sulfate, (meth)acryloyloxyethyldiethyl-methylammonium chloride, (meth)acryloyloxyethyidiethylmethylammonium methyl sulfate, (meth)acryloyloxyethyldimethylbenzylammonium chloride, and (meth)acryloyloxyethyl-dimethylbenzylammonium methyl sulfate; i.e. A=O, B=$CH_2CH_2$, $R_1$=H or $CH_3$, $R_2$=$R_3$ =$CH_2CH_3$ or $CH_3$, $R_4$=$CH_3$ or benzyl, and X =CI or $CH_3SO_4$. Most preferably, recurrin units of the formula (I) are acryloyloxyethyidiethylmethylammonium methyl sulfate (A=O, B=$CH_2CH_2$, $R_1$=H, $R_2$=$R_3$=$CH_2CH_3$, $R_4$=$CH_3$, X=$CH_3SO_4$) and acryloyloxyethyl trimethylammonium chloride (AETAC) (A =O, B=$CH_2CH_2$, $R_1$=H, $R_2$=$R_3$=$R_4$=$CH_3$, X=CI). For the purposes of the instant invention, recurring units may be referred to by the name of the corresponding monomer.

The first cationic water-soluble or water-swellable polymer is a copolymer and contains anionic recurring units. Surprisingly, the inclusion of even very small amounts of anionic recurring units may have the unexpected effect of inducing the formation of the aqueous dispersion and/or reducing the bulk viscosity of the aqueous dispersion. For instance, if an aqueous dispersion is not formed in a mixture of a first cationic polymer that does not contain anionic recurring units and a second water-soluble polymer, the inclusion of dispersion-creating amounts of anionic recurring units into the first cationic polymer causes an aqueous dispersion to result. Also, if an aqueous dispersion having a particular bulk viscosity is formed in a mixture of a first cationic polymer that does not contain anionic recurring units and a second water-soluble polymer, the inclusion of bulk viscosity-reducing amounts of anionic recurring units into the first cationic polymer causes the bulk viscosity of the aqueous dispersion to be reduced relative to the aqueous dispersion which contains the first cationic polymer that does not contain the anionic recurring units. Furthermore, even if the first cationic polymer in the aqueous dispersion does contain anionic recurring units, the inclusion of additional anionic recurring units frequently causes a further reduction in the bulk viscosity of the aqueous dispersion.

The anionic recurring units in the first cationic polymer may be any anionic recurring unit and may be formed by polymerization of the corresponding monomers or by post-reaction of the first polymer. Examples of suitable anionic monomers include acrylic acid, methacrylic acid, ethacrylic acid, maleic acid, itaconic acid, 2-acrylamido-2-methylpropanesulfonic acid, vinylsulfonic acid, vinylsulfuric acid, vinylphosphonic acid, styrenesulfonic acid, styrenesulfuric acid, and ammonium and alkali metal salts thereof. Anionic recurring units may be formed by post-reaction e.g. hydrolysis of (meth)acrylamide or (meth)acrylate recurring units. Preferred anionic monomers are acrylic acid, methacrylic acid, 2-acrylamido-2-methylpropanesulfonic acid, styrenesulfonic acid and ammonium and alkali metal salts thereof. For the purposes of the instant invention, anionic recurring units may be referred to herein by the name of the corresponding monomer, and reference herein to the acid form of the recurring unit or monomer also encompasses the salt form.

The first cationic polymer may contain from about 0.01% to about 49.9% anionic recurring units, by mole based on total moles of recurring units in said first polymer, so long as the net charge on the first polymer remains cationic. Generally, this means that the number of moles of cationic recurring units is greater than the number of moles of anionic recurring units. Preferred levels of anionic recurring units often depend on the desired level of cationic charge and the desired bulk viscosity. The anionic recurring units may tend to neutralize the cationic charge and reduce bulk viscosity, so often the level of anionic recurring units is chosen to advantageously reduce bulk viscosity without disadvantageously neutralizing too great a portion of the cationic charge. Therefore, the preferred level of anionic charge is often determined by taking into account both the desired cationic charge and the desired bulk viscosity. Fortunately, it has been discovered that the bulk viscosity is surprisingly sensitive to the level of anionic recurring units, so that the inclusion of even very small amounts of anionic recurring units can significantly reduce bulk viscosity. Even greater reductions are possible by including even greater amounts of anionic recurring units. Preferably, anionic recurring units are present in bulk viscosity-reducing amounts. Advantageous effects may be observed when the content of anionic recurring units is about 0.1% to about 99.9% of the content of the cationic recurring units, on a mole basis, preferably about 0.5% to about 70%, more preferably about 1% to about 50%, even more preferably about 1.5% to about 30%, most preferably about 1.5% to about 20%, same basis.

Anionic recurring units may be incorporated into the first cationic polymer in amounts that are dispersion-creating. Dispersion-creating amounts of anionic recurring units are those that cause the formation of an aqueous dispersion in a mixture of a first cationic polymer and a second water-soluble polymer when incorporated into the first polymer, where an aqueous dispersion is not formed in a comparable mixture that does not contain said dispersion-creating amounts of said anionic recurring units. Dispersion-creating amounts of anionic recurring units generally range from about 0.1% to about to about 99.9% of the content of the cationic recurring units, on a mole basis, preferably about 0.5% to about 70%, more preferably about 1% to about 50%, even more preferably about 1.5% to about 30%, most preferably about 1.5% to about 20%, same basis. Anionic recurring units may be present in amounts that are both dispersion-creating and bulk viscosity-reducing.

The first water-soluble or water-swellable polymer may also contain other cationic recurring units or nonionic recurring units. Nonionic recurring units may be formed from water-soluble monomers such as N-vinylpyridine, N-vinylacetamide, N-vinylpyrrolidone, hydroxyalkyl(meth) acrylates, etc., preferably (meth)acrylamide, or may be formed from hydrophobic monomers having low water-solubility, so long as the inclusion of the poorly water-soluble, e.g. hydrophobic, recurring units does not render the resulting polymer water-insoluble or water-nonswellable. The first cationic polymer may contain amounts of recurring units of water-soluble non-ionic monomers ranging from 0% to about 99%, preferably about 10% or greater, more preferably about 20% or greater, most preferably about 30% or greater; preferably about 90% or less, more preferably about 80% or less, most preferably about 70% or less, by mole based on total moles of recurring units in said polymer. The hydrophobic monomers may be hydrocarbon monomers e.g. styrene, butadiene, 1-alkene, vinyl cyclohexane, etc., other vinyl monomers such as vinyl halide, other primarily aliphatic or aromatic compounds with polymerizable double bonds, or monomers with only moderate water-solubility such as acrylonitrile. Preferably, the hydrophobic monomers are alkyl (alk)acrylates or aryl (alk)acrylates in which the alkyl or aryl groups contain about 1–12 carbon atoms, such as methyl (meth)acrylate, ethyl (meth)acrylate, propyl (meth)acrylate, butyl (meth)acrylate, hexyl (meth)acrylate, ethylhexyl (meth)acrylate, isoalkyl (meth)acrylate, cyclohexyl (meth)acrylate, or aromatic (meth)acrylate, or alkyl or aryl (alk)acrylamides in which the alkyl or aryl groups contain about 1–12 carbon atoms, such as methyl (meth) acrylamide, ethyl (meth)acrylamide, t-butyl (meth) acrylamide, dimethyl (meth)acrylamide, hexyl (meth) acrylamide, ethylhexyl (meth)acrylamide, isoalkyl (meth) acrylamide, cyclohexyl (meth)acrylamide, or aromatic (meth)acrylamide. A particularly preferred hydrophobic non-ionic monomer is t-butylacrylamide. The first cationic water-soluble or water-swellable polymer may contain amounts of hydrophobic non-ionic recurring units ranging from 0% to about 15%, preferably about 0.5% to about 12%, most preferably about 1% to about 10%, by mole based on total moles of recurring units in said polymer. Although hydrophobic recurring units may be dilutive of the polymer effect in certain applications, inclusion in controlled amounts may advantageously affect a particular characteristic of the aqueous dispersion, e.g. solubility rate, bulk viscosity, cost, ease of processing, performance, etc. Depending on the specific embodiment, it may be preferable for the polymer to be devoid of hydrophobic recurring units, or to contain chosen amounts e.g. bulk viscosity-reducing amounts of hydrophobic recurring units so as to achieve an advantageous effect without disadvantageously increasing the dilutive effect.

The amount of the first cationic water-soluble or water-swellable polymer in the aqueous dispersion is as high as practicable, taking into account the effect of high solids on bulk viscosity, preferably about 5% or greater, more preferably about 10% or greater, most preferably about 20% or greater, by weight based on the total weight of the aqueous dispersion. Generally, the solids are not increased above an amount which increases the bulk viscosity to an impractical level. Practically, the amount of first cationic polymer in the aqueous dispersion is about 75% or less, preferably about 60% or less, more preferably about 50% or less, by weight based on total weight. The weight average molecular weight of the first cationic polymer in the aqueous dispersion is not critical and depends on the application, but is generally higher than about 1,000,000, preferably greater than about 2,000,000, more preferably greater than about 5,000,000, and most preferably greater than about 10,000,000. Molecular weights of polymers are weight average and may be determined by means known to those skilled in the art, preferably by light scattering.

Although aqueous dispersions prepared by polymerization of monomers as herein described may sometimes have an average droplet size of about 30 microns or more, the average droplet size is generally less than about 30 microns, preferably less than 20 microns, more preferably about 15 microns or less. Droplet size of a non-spherical droplet is the length along a major axis. Droplet size and shape tend to be a function of reactor conditions such as stirring rate, reactor configuration, type of stirrer, etc. Preferably, the size of the droplets is chosen by carrying out the polymerization in the presence of one or more insoluble polymeric seeds, said polymeric seeds being insoluble in an aqueous solution having the same inorganic salt concentration as said aqueous dispersion. Although large aqueous droplets or gel particles may be formed by adding dry or gel polymer to the other components as in U.S. Pat. No. 4,673,704 and EP 0 170 394 A2, the aqueous dispersions of the instant invention are preferred because it is generally more desirable for the first cationic polymer to be in the form of small droplets which are generally held suspended in a continuous matrix of the aqueous phase and do not generally rest substantially in contact with one another.

The aqueous dispersions of the instant invention contain a second water-soluble polymer, preferably a vinyl-addition polymer, that is different from and, preferably, incompatible with, said first water-soluble or water-swellable cationic polymer. The second polymer is different from the first polymer when it can be distinguished from the first polymer on the basis of a particular physical characteristic e.g. chemical composition, charge, molecular weight, molecular weight distribution, distribution of recurring units along the polymer chain, etc., by known characterization methods e.g. spectroscopy, chromatography, etc. The second polymer is incompatible with the first polymer when solutions of the two polymers, at the concentrations present in the aqueous dispersion, do not form a homogenous mixture when blended, or do not form a homogenous mixture when one polymer is formed by polymerization of monomers in the presence of the other polymer.

The second, preferably cationic, water-soluble polymer in the aqueous dispersion of the instant invention is generally dissolved in the aqueous continuous phase, although of course minor amounts may be found in the discontinuous phase. The amount of second polymer in the discontinuous and continuous phases may be determined by known analytical techniques e.g. Raman microscopy. The second polymer may be any nonionic water-soluble polymer, preferably a polyalkyleneoxide, a polyvinylalcohol, polyvinylpyridine, polyvinylpyrrollidone, polyhydroxylalkyl(alk)acrylate, etc., most preferably poly(meth)-acrylamide. Even more preferably, the second water-soluble polymer is cationic. The second polymer may be any cationic polymer, and the charge may vary over a broad range by containing about 1% to about 100% cationic recurring units, preferably about 10% or greater, more preferably about 20% or greater, even more preferably about 30% or greater, by mole based on total moles of recurring units in the polymer. Although in some cases the second cationic polymer may contain about 70% or less, or even about 50% or less, of cationic recurring units, preferably the second polymer is predominately cationic i.e. contains more than 50% cationic recurring units, by mole based on total moles of recurring units in the polymer; most preferably about 80% or greater of recurring cationic units, same basis. Cationic recurring units may be formed by polymerization of cationic monomers or by post-reaction of polymer as above, and may be a copolymer and may contain other cationic recurring units, anionic recurring units, or nonionic recurring units as above. Preferred second cationic water-soluble polymers contain recurring units of diallyldialkyl-ammonium halide, methyl chloride quaternary salt of dialkylaminoalkyl(alk)acrylate, dimethyl sulfate quaternary salt of dialkylaminoalkyl(alk)acrylate, methyl chloride quaternary salt of dialkylaminoalkyl(alk) acrylamide, or dimethyl sulfate quaternary salt of dialkylamino-alkyl(alk)acrylamide. Especially preferred second cationic water-soluble polymers contain recurring units of diallyldimethylammonium chloride, methyl chloride quaternary salt of dimethylaminoethyl(meth)acrylate, or dimethyl sulfate quaternary salt of dimethyl-aminoethyl (meth)acrylate. One or more second cationic polymers may be used.

Depending on the application, it may be preferable for the second polymer to be cationic in order to maximize the cationic charge density of the aqueous dispersion. Also, for embodiments which contain salt, it may be preferable for the second polymer to be cationic because cationic polymers are often more soluble in salt solution than nonionic polymers.

The amount of the second, preferably cationic, water-soluble polymer in the aqueous dispersion is generally chosen to control aqueous dispersion properties e.g. performance, bulk viscosity, charge, molecular weight, solubility rate, physical stability, e.g. settling, etc. Generally, the amount of said second polymer is about 5% or greater, preferably about 10% or greater, more preferably about 20% or greater, most preferably about 30% or greater, by weight based on the amount of first cationic water-soluble polymer. Practically, the amount of second water-soluble polymer in the aqueous dispersion is 100% or less, preferably about 80% or less, more preferably about 50% or less, by weight based on the amount of first cationic water-soluble polymer. The amounts of the first and second polymers are generally chosen to be effective to form an aqueous dispersion, e.g. the first and second polymers are used in dispersion-creating amounts. In the absence of one or the other polymer, an aqueous dispersion is not formed and a homogeneous composition is obtained instead. Practically, the amount of first and second polymer may be found by routine experimentation, and different amounts will ordinarily be used depending on the identity of the first and second polymers, the total polymer solids level, the bulk viscosity, cost, ease of production, product performance, etc.

The weight average molecular weight of the second water-soluble polymer in the aqueous dispersion is also generally chosen to provide the most advantageous effect, e.g. bulk viscosity, performance, cost, etc., but is generally higher than about 10,000, preferably greater than about 50,000, more preferably greater than about 500,000, and most preferably greater than about 1,000,000. Molecular weights of polymers are weight average and may be determined by means known to those skilled in the art, preferably by light scattering. The second water-soluble polymer is primarily in the continuous phase of the aqueous dispersion, although of course minor amounts may be contained in the dispersed droplets. Preferably, the aqueous dispersions of the instant invention are heterogeneous compositions in which more than 50%, preferably about 75% or more, of the first cationic water-soluble or water-swellable polymer is in the form of a discontinuous phase of aqueous droplets that are dispersed in an aqueous solution that is comprised of more than 50%, preferably about 75% or more, of the second, preferably cationic, water-soluble polymer.

The aqueous dispersions of the instant invention may contain a third water-soluble or water-swellable polymer that is different from the first or second polymers. For instance, the third polymer may also be contained in droplets dispersed in the aqueous solution, in which case it may be described as discussed above for the first cationic polymer. The third polymer may also be dissolved in the aqueous solution along with the second polymer, in which case it may be described as discussed above for the second polymer. Preferably, the third polymer is cationic.

A third aqueous dispersion, containing three or more polymers, may be formed by blending first and second aqueous dispersions of the instant invention, wherein the first and second aqueous dispersions are different from each other. Blending is generally carried out by intermixing the aqueous dispersions, typically with stirring. Blending may be advantageous to achieve a balance of properties exhibited by the individual aqueous dispersions, e.g. performance, charge, total polymer solids, cost, molecular weight, etc. Surprisingly, in many cases the blends are stable, e.g. remain in the form of aqueous dispersions having low bulk viscosity e.g. less than 10,000 centipoise (cps) for periods of one week or more, even when the salt or second polymer level in the blend is greatly different from the level needed to obtain a stable product for one or both of the dispersed polymers, if formulated alone. Also surprisingly, the bulk viscosity of the blend is often lower than the bulk viscosity of any of the individual aqueous dispersions.

The molecular weight of the aqueous dispersion, as that term is used herein, is simply the weight average molecular weight of the polymers contained therein, obtained by subjecting the entire dispersion to a suitable molecular weight characterization technique e.g. light scattering. Since the aqueous dispersion contains two or more different polymers, each of which may have a molecular weight and molecular weight distribution different from the other(s), the molecular weight distribution of the aqueous dispersion may be multimodal. The molecular weight of the aqueous dispersion is generally about 1,000,000 or greater, preferably greater than 2,000,000, more preferably about 3,000,000 or greater, most preferably about 5,000,000 or greater.

In some cases it may be more convenient to characterize the aqueous dispersion in terms of standard viscosity instead of by molecular weight. As used herein, "standard viscosity" is determined by: diluting an aqueous dispersion with water to form an aqueous admixture (in the case of water-swellable polymers) or solution (in the case of water-soluble polymers) having a polymer concentration of about 0.2%; mixing together 8.0 g of this aqueous admixture or solution with 8.6 g of 2M NaCl; and then measuring the viscosity of the resultant mixture at 25° C. on a rotating cylinder viscometer e.g. Brookfield Viscometer equipped with a UL adapter at 60 rpm. The standard viscosities of the aqueous dispersions of the instant invention are generally about 1.5 cps or greater, preferably about 1.8 cps or greater, more preferably about 2.0 cps or greater, most preferably about 2.5 cps or greater, depending on the application.

The aqueous dispersions of the instant invention may also be intermixed with water-in-oil emulsions or microemulsions of water-soluble or water-swellable polymers to form compositions which, though they contain oil, contain proportionately less oil than the water-in-oil emulsions or microemulsions from which they are derived. Consequently, these compositions may advantageously produce less secondary pollution, have lower flammability, etc.

Certain preferred embodiments of the instant invention require salt. Effective amounts of salt tend to reduce the bulk viscosity of the aqueous dispersion. The salt may be any inorganic salt, preferably a kosmotropic salt e.g. a chloride, sulfate, phosphate, or hydrogenphosphate salt, more preferably ammonium sulfate, sodium chloride, and sodium sulfate, most preferably sodium sulfate and ammonium sulfate. The counterion may be any counterion, e.g. Group IA and Group IIA metal ions, ammonium, etc., preferably ammonium, sodium, potassium and magnesium. Mixtures of salts may be used, and the amount of salt may be chosen to achieve a desirable bulk viscosity or any other desirable effect. Since the salt may have a dilutive effect, in preferred embodiments the salt is only added in amounts so as to achieve a homogeneous composition in the absence of the second water-soluble polymer. In these embodiments, the aqueous dispersion is not formed by the action of the salt, but by the interaction of the first and second polymers. Effective or bulk viscosity-reducing amounts of salt may be found through routine experimentation and are generally chosen to reduce the bulk viscosity without causing precipitation of the polymer. Salt levels may range upwards from 0%, preferably about 3% or greater, most preferably about 5% or greater, by weight based on total weight, depending on the upper limit to solubility, because solubility of the salt in the aqueous dispersion is preferred. Salt levels are chosen to favorably influence product attributes such as cost, bulk viscosity, etc. and frequently, no practical effect of the salt is observed above about 35%, so salt levels are generally about 35% or less, preferably about 30% or less, most preferably 25% or less, by weight based on total weight. Practically, the salt level may be determined by routine experimentation, e.g. balancing the tendency for positive product attributes e.g. lower bulk viscosities resulting from higher salt levels, against the negative aspects of salt use e.g. cost and dilutive effect.

Mixtures of chaotropic salts with kosmotropic salts, or anionic organic salts with kosmotropic salts, have a tendency to reduce the bulk viscosity of the aqueous dispersion. In many cases, the salt mixture is more effective than either salt alone, on a weight basis. Useful chaotropic salts include thiocyanates, perchlorates, chlorates, nitrates, bromides, iodides, and mixtures thereof, preferably sodium thiocyanate and sodium iodide. Useful anionic organic salts include anionic surfactants and anionic hydrotropic salts, preferably aryl and substituted aryl sulfonates having from 6 to 22 carbons, preferably 6 to 18 carbons, and alkyl and substituted alkyl sulfonates having from 2 to 22 carbons, preferably 4 to 18 carbons, and mixtures thereof. Especially preferred anionic organic salts are dialkylsulfosuccinates, diarylsulfosuccinates, benzenesulfonates, benzenedisulfonates, naphthalensulfonates, naphthalenedisulfonates, and mixtures thereof; 1,3-benzendisulfonates are most preferred. Counterions to the chaotropic and anionic organic salts may be any typical counterion, e.g. Group IA metal ions, ammonium, etc., preferably ammonium, sodium, and potassium. Effective or bulk viscosity-reducing amounts of chaotropic and anionic organic salts may be found through routine experimentation and are generally chosen to reduce the bulk viscosity without causing precipitation of the polymer. In certain preferred embodiments, the amounts of chaotropic salt, or anionic organic salt, and kosmotropic salt are chosen such that a homogeneous composition is obtained in the absence of the second cationic polymer; i.e. the concentration of the salts is such that the first cationic polymer is not precipitated in the absence of the second cationic polymer. Generally, amounts of chaotropic, or anionic organic, salts are about 10% or less, preferably about 5% or less, and generally 0.5% or more, preferably 1% or more, by weight based on total weight. At very low chaotropic or anionic organic salt levels, the viscosity-reducing effect of the salt may be very small, whereas the salt may cause undesirable precipitation or layering at high levels of incorporation. To achieve a certain bulk viscosity, amounts of kosmotropic salts used with the chaotropic, or anionic organic salt, are generally less than when the kosmotropic salt is used alone, but still within the ranges given above for the use of inorganic or kosmotropic salts alone.

The aqueous dispersions of the instant invention generally have lower bulk viscosities than comparable aqueous dispersions. A comparable aqueous dispersion is generally one which is substantially identical in many functional aspects, but lacks a particular element of the instant invention. In general, the aqueous dispersions of the instant invention have lower bulk viscosities than comparable aqueous dispersions which have substantially the same polymer solids, cationic charge level and weight average molecular weight, but which lack an important or preferred feature of the instant invention e.g. lack an anionic recurring unit; are not made by a process which comprises polymerizing vinyl-addition monomers comprised of at least one anionic comonomer; lack dispersion-creating or bulk viscosity-reducing amounts of anionic recurring units, lack bulk viscosity-reducing amounts of salt, lack bulk viscosity-reducing additives, lack bulk viscosity-reducing amounts of hydrophobic recurring units, etc.

Dispersions in which the first polymer is comprised of anionic recurring units generally have lower bulk viscosities than aqueous dispersions that are substantially identical except that the first polymer contains fewer or no anionic recurring units. The bulk viscosity of aqueous dispersions is typically influenced by e.g. total polymer solids, salt level, polymer type, ratio of first cationic polymer to second cationic polymer, etc. as disclosed herein. Although aqueous dispersions having bulk viscosities of about 20,000 cps or more, or even about 200,000 cps or more may be suitable in certain circumstances, much lower bulk viscosities are generally preferred for ease of handling. Aqueous dispersions having bulk viscosities of about 20,000 cps or less, preferably about 10,000 cps or less, more preferably about 8,000 cps or less, even more preferably about 5,000 cps or less, most preferably about 2,500 cps or less, may be obtained by the practice of the instant invention. Bulk viscosity may be measured by any convenient method known to those skilled in the art, preferably a rotating cylinder viscometer as described in the Examples below.

Aqueous dispersions are preferred which have as many of the following advantageous attributes as possible: relatively high cationic polymer solids, preferably 20% or greater, more preferably 25% or greater, by weight based on total; high molecular weight, preferably 2,000,000 or greater, more preferably 5,000,000 or greater; reduced environmental impact (low VOC, substantially free of organic solvents and aromatic groups, e.g. aromatic- or benzyl-containing oils or recurring units); minimal levels of diluents (preferably, 20% or less of salt, by weight based on total); bulk viscosity about 2,000 cps or less; and superior or equivalent performance. Products having all of these attributes may be obtained by the practice of the present invention.

Aqueous dispersions of water-soluble polymers are preferably formed by polymerization of the corresponding monomers to form the first cationic water-soluble polymer, in the presence of at least one second cationic water-soluble polymer and, in certain embodiments, an inorganic salt.

Polymerization may be effected by any initiating means, including redox, thermal or irradiating types. Examples of preferred initiators are 2,2'-azobis(2-amidino-propane) dihydrochloride (V-50), 2,2'-azobis(isobutyronitrile), sodium bromate/sulfur dioxide, potassium persulfate/ sodium sulfite, and ammonium persulfate/sodium sulfite, as well as peroxy redox initiators e.g. those disclosed in U.S. Pat. No. 4,473,689. Initiator levels are chosen in a known manner so as to create polymers of the desired molecular weight. Amounts of chain transfer agents, e.g. isopropanol, lactic acid, mercaptoethanol, etc. and branching or crosslinking agents, e.g. methylenebisacrylamide may be added in a known manner to further adjust the properties of the first cationic water-soluble polymer. Depending on the production conditions, e.g. types and relative amounts of chain transfer agent and branching agent, water-swellable or branched, water-soluble polymers may be formed. In general, the use of greater amounts of branching or crosslinking agent increases the tendency for the product to be water-swellable instead of water-soluble, and increased amounts of chain transfer agent tend to reduce molecular weight. When chain transfer agent and branching agent are used together, water-swellable products are more likely to be obtained at high branching agent and low chain transfer agent levels, whereas branched, water-soluble polymers may be obtained at high chain transfer and low branching agent levels. Components may be added at any time; e.g. all of the monomers may be present from the onset of the polymerization, or monomers may be added during the course of the polymerization. If salt is used, all of the salt may be present from the onset of the polymerization, or salt may be added during the course of the polymerization or after polymerization is complete. Likewise, polymerization parameters e.g. temperature and time may be chosen in a known manner, and may be varied during the course of the polymerization. Polymerization is generally effected in the presence of an inert gas, e.g. nitrogen. Conventional processing aids e.g. chelating agents, sequestrants, pH adjusters, etc. may be added as required.

The aqueous dispersions of the present invention have advantageous aspects in that they are preferably substantially free of dilutive substances such as surfactant, oil, hydrocarbon liquids, organic solvents, etc. Although bulk viscosity-reducing additives e.g. glycerin, glycerol, methanol, ethanol, t-butanol, glycol, etc. may be present in the aqueous dispersions at levels of 10% or even 20% or greater, amounts should be about 10% or less, more preferably about 5% or less, most preferably about 1 % or less, in order to maintain the advantageous properties of the invention. If the addition of a bulk viscosity-reducing additive is desired, preferred additives are glycerol and t-butanol.

The aqueous dispersions of the instant invention may be homogenous in the absence of a particular component e.g. the first cationic polymer, the second water-soluble polymer, the salt or salts, etc. Homogenous compositions are generally characterized as being clear or translucent, and are not aqueous dispersions because they do not contain dispersed droplets as described above. Where a mixture of a first and second polymer forms a homogeneous composition, inclusion of dispersion-creating amounts of anionic recurring units in the first polymer causes the mixture to form an aqueous dispersion that is not a homogeneous composition. Thus, the first cationic polymer or the second cationic water-soluble polymer may be dispersion-creating, or the level of anionic recurring units in the first polymer may be dispersion creating, in that aqueous dispersions are not obtained in the absence of an effective or dispersion-creating amount of the particular component.

Waters used in the present invention may be from any source, e.g. process water, river water, distilled water, tap water, etc. Preferably, polymerizations are conducted in aqueous solutions that do not contain substantial amounts of materials which detrimentally affect the polymerization. Advantageously, the aqueous dispersions of the present invention tend to dissolve quickly when diluted with water.

The aqueous dispersion of the instant invention may be dehydrated to increase the total polymer solids content, or to create substantially dry products. Any means known in the art e.g. stripping, spray drying, solvent precipitation, etc. may be used to reduce the water content. Surprisingly, partial dehydration may reduce the bulk viscosity of an aqueous dispersion, in spite of the tendency for dehydration to increase polymer solids. Dehydration may be performed by heating, preferably under reduced pressure, although of course excessive heating may be detrimental to polymer properties. A substantially dry mass of polymer may be obtained by removal of water, and the mass may be comminuted to create a powdery, particulate, or granular product. Substantially dry polymer products may be obtained by spray-drying the aqueous dispersions of the instant invention. Spray-drying may be carried out as described in U.S. Pat. No. 5,696,228, which is hereby incorporated herein by reference. The particle size of the substantially dry polymer product is generally about 10 microns or greater in diameter, preferably about 40 microns or greater, more preferably about 100 microns or greater, most preferably about 200 microns or greater. It is preferred that the polymer particles be non-dusting. Dusting and flow problems are typically exacerbated when the polymer particles are small, so larger polymer particles are generally desirable. However, very large particles may dissolve more slowly. Therefore, it is generally desirable for the polymer particles to be about 1200 microns or less in diameter, preferably about 800 microns or less in diameter, more preferably about 600 microns or less, most preferably about 400 microns or less. Generally, at least about 90% of the polymer particles range in size from about 10 microns to about 1200 microns, preferably at least about 95%, more preferably at least about 98%. The size of the polymer particles can be varied somewhat by altering the operational parameters e.g. spray configuration, aqueous dispersion viscosity, feed rate, etc. Particles may be substantially spherical or non-spherical; "diameter" of a non-spherical particle is the dimension along a major axis.

The particles formed by spray-drying the aqueous dispersions of the instant invention may be screened to remove an oversize or undersize fraction. Oversize particles may be fragmented by e.g. grinding, whereas undersized particles are generally agglomerated. Sizes may be determined by methods known to those skilled in the art e.g. sieving, screening, light scattering, microscopy, microscopic automated image analysis, etc.

Under the conditions of drying set forth herein, the polymer particles produced by the processes described herein are substantially dry. As used to describe the polymer produced herein, "substantially dry" generally means that the polymer contains about 12% or less volatiles, preferably about 10% or less by weight, based on the weight of the spray dried polymer. The polymer generally contains about 2% or more volatiles, preferably about 5% or more, by weight based on total weight, and most preferably contains from about 8% to about 10% volatiles by weight, same basis. The volatiles are measured by determining the weight loss on drying the polymer product at about 105° C. for about 30 minutes.

The spray-dried polymer particles of the instant invention may be agglomerated. Agglomeration may improve the flow properties and dissolution times of the polymers. Agglomeration is a known process for increasing particle size, see e.g. U.S. Pat. No. 5,696,228. The agglomerates formed by agglomerating the polymer particles of the instant invention tend to have improved flow properties and faster dissolution times when compared to the unagglomerated polymer particles. Preferably, the agglomerates are non-dusting. Typically, about 90% of the agglomerates of the instant invention have an agglomerate size of about 120 microns or greater, preferably about 160 microns or greater, more preferably about 200 microns or greater, most preferably about 300 microns or greater. Generally, about 90% of the agglomerates have an agglomerate size of about 1500 microns or less, preferably about 1200 microns or less, more preferably about 1100 microns or less, most preferably about 1000 microns or less. Thus, about 90%, preferably 95%, of the agglomerates have a size in the range of about 120 to about 1500 microns, preferably about 160 microns to about 1200 microns, more preferably about 200 microns to about 1100 microns, most preferably about 300 microns to about 1000 microns Usually, at least about 5% of the agglomerates, preferably at least about 10%, most preferably at least about 15%, are larger than about 900 microns. The agglomerates formed by agglomerating the spray-dried particles of the instant invention may be screened to remove an oversize or undersize fraction. Preferably, agglomerates larger than about 1200 microns and smaller than about 175 microns are removed by e.g. screening. Oversize agglomerates are generally fragmented by e.g. grinding, whereas undersized agglomerates are generally recycled into the agglomerator.

The substantially dry polymer particles and agglomerates of the present invention are generally comprised of the polymer that was contained in the aqueous dispersion that was spray-dried, as discussed hereinabove. Spray-drying is a particularly advantageous method for minimizing stratification effects, as described in U.S. Pat. No. 5,696,228.

A suspension of dispersed solids may be dewatered by a method which comprises (a) intermixing an effective amount of an aqueous dispersion of polymers, or aqueous admixture thereof, with a suspension of dispersed solids, and (b) dewatering said suspension of dispersed solids. Substantially dry polymers derived from the aqueous dispersions of the instant invention as described above may also be used to dewater suspended solids. For instance, a suspension of dispersed solids may be dewatered by a method which comprises (a) intermixing an effective amount of a substantially dry water-soluble or water-swellable polymer, or aqueous admixture thereof, with a suspension of dispersed solids, and (b) dewatering said suspension of dispersed solids. Preferably, an aqueous admixture of the dry polymer or aqueous dispersion is prepared by intermixing the dry polymer or aqueous dispersion with water, more preferably by dissolving the dry polymer or aqueous dispersion in water to form a dilute polymer solution. Effective amounts of dry polymer or aqueous dispersion are determined by methods known in the art, preferably by routine laboratory or process experimentation.

Examples of suspensions of dispersed solids which may be dewatered by means of the instant invention are municipal and industrial waste dewatering, clarification and settling of primary and secondary industrial and municipal waste, potable water clarification, etc. Because of the advantageous aspects of the invention e.g. substantially oil-free, minimum amounts of inactive diluents, little or no surfactant, etc., the polymers may be especially well-suited to situations where part or all of the dewatered solids or clarified water is returned to the environment, such as sludge composting, land application of sludge, pelletization for fertilizer application, release or recycling of clarified water, papermaking, etc. Other applications which may benefit from the advantageous aspects of the instant inventions include soil amendment, reforestation, erosion control, seed protection/growth, etc., where the aqueous dispersion or dry polymer, preferably an aqueous admixture thereof, is advantageously applied to soil.

Other examples of suspensions of dispersed solids which may be dewatered by means of the instant invention are found in the papermaking area, e.g. the aqueous dispersions or dry polymer may be used as retention aids, drainage aids, formation aids, washer/thickener/drainage production aid (DNT deink application), charge control agents, thickeners, or for clarification, deinking, deinking process water clarification, settling, color removal, or sludge dewatering. The polymers of the instant invention may also be used in oil field applications such as petroleum refining, water clarification, waste dewatering and oil removal, see e.g. U.S. Pat. No. 5,330,650 which is hereby incorporated herein by reference. For instance, oily water e.g. mixtures of water and oil may be treated to with the aqueous dispersions of the instant invention in order to reduce the amount of water in the oil, or reduce the amount of oil in the water, by a method which comprises intermixing an aqueous dispersion of polymers, or aqueous admixture thereof, in an amount effective for treatment, with oily water, and separating the resultant flocculated oil from the resultant treated water.

Dewatering and clarification applications for the aqueous dispersions and dry polymers of the instant invention may also be found in the food processing area, including waste dewatering, preferably waste dewatering of poultry beef, pork and potato, as well as sugar decoloring, sugar processing clarification, and sugar beet clarification.

Mining and mineral applications for the aqueous dispersions and dry polymers of the instant invention include treating various mineral slurries, coal refuse dewatering and thickening, tailings thickening, and Bayer process applications such as red mud settling, red mud washing, Bayer process filtration, hydrate flocculation, and precipitation.

Biotechnological applications for the aqueous dispersions and dry polymers of the instant invention include dewatering and clarification of wastes and preferably, dewatering and clarification of fermentation broths.

The aqueous dispersions of the instant invention may be employed in the above applications alone, in conjunction with, or serially with, other known treatments.

All patents mentioned above are hereby incorporated herein by reference. Unless otherwise specified, all percentages mentioned herein are understood to be on a weight basis.

The Standard Viscosity (SV) values in the following Examples were determined by mixing together 8.0 g of a 0.2 wt. % polymer solution in water and 8.6 g of 2M NaCl, then measuring the viscosity of the resultant solution at 25° C. on a Brookfield Viscometer equipped with a UL adapter at 60 rpm. Molecular weights were determined by high performance size exclusion chromatography using a light scattering detector. The bulk viscosity (BV) values in the following examples were determined with a rotating cylinder viscometer (Brookfield) equipped with at No. 4 spindle at 30 rpm and 25° C.

In the Tables below, recurring units are referred to by the appropriate abbreviations for the corresponding monomer.

Amounts of recurring units are shown on a percentage basis by mole, based on total moles of recurring units in the polymer.

EXAMPLE 1C (Comparative)

A suitable vessel equipped with a mechanical stirrer, reflux condenser, and a nitrogen inlet tube was charged with 71.03 parts deionized water and 38.5 parts of a 40% aqueous solution of the polymer obtained by polymerizing the methyl chloride quaternary salt of dimethylaminoethylmethacrylate (poly(DMAEM.MeCl)), weight average molecular weight about 220,000. After completion of dissolution, 26.72 parts of a 52.6% aqueous solution of acrylamide (AMD), and 31.93 parts of an 80% aqueous solution of acryloyloxyethyltrimethylammonium chloride (AETAC) were added and mixed. To this mixture, 44 parts ammonium sulfate, 1.17 parts citric acid, and 2.77 parts of a 2% solution of chelant ethylenediaminetetraacetic acid disodium salt were added and mixed. The pH of the mixture was about 3.3. The vessel was sealed and sparged with nitrogen for 30 minutes, and then polymerization was started by adding 2.48 parts of 2% aqueous solution of 2,2'-azobis(2-amidino-propane) dihydrochloride (V-50). The reaction mixture was heated to about 40° C. for 2 hours, then raised to 50° C. for 4 hours, then cooled. During the process of polymerization, the contents of the vessel became so viscous that stirring became extremely difficult.

EXAMPLE 2

A suitable vessel equipped with a mechanical stirrer, reflux condenser, and a nitrogen inlet tube was charged with 76.55 parts deionized water and 38.5 parts of a 40% aqueous solution of the polymer obtained by polymerizing the methyl chloride quaternary salt of dimethylaminoethylmethacrylate (poly(DMAEM,MeCl)), weight average molecular weight about 220,000. After completion of dissolution, 22.25 parts of a 54.8% aqueous solution of acrylamide (AMD), 30.22 parts of a 80% aqueous solution of acryloyloxyethyltrimethylammonium chloride (AETAC), and 3.23 parts of 2-acrylamido-2-methylpropanesulfonic acid (AMPS) were added and mixed. To this mixture, 44 parts ammonium sulfate and 2.77 parts of a 2% solution of chelant ethylenediaminetetraacetic acid disodium salt (EDTA) were added and mixed. The pH of the mixture was about 3.3. The vessel was sealed and sparged with nitrogen for about 30 minutes, and then polymerization was started by adding 2.48 parts of 2% aqueous solution of 2,2'-azobis(2-amidino-propane) dihydrochloride (V-50). The reaction mixture was heated to about 40° C. for 2 hours, then at about 50° C. for 4 hours, then cooled. The resulting aqueous dispersion became viscous after cooling, but still contained dispersed droplets.

EXAMPLE 3

A suitable vessel equipped with a mechanical stirrer, reflux condenser, and a nitrogen inlet tube was charged with 78.24 parts deionized water and 38.5 parts of a 40% aqueous solution of the polymer obtained by polymerizing the methyl chloride quaternary salt of dimethylaminoethylmethacrylate (poly(DMAEM.MeCl)), weight average molecular weight about 220,000. After completion of dissolution, 19.2 parts of a 54.8% aqueous solution of acrylamide (AMD), 28.68 parts of a 80% aqueous solution of acryloyloxyethyltrimethylammonium chloride (AETAC), and 6.13 parts of 2-acrylamido-2-methylpropanesulfonic acid (AMPS) were added and mixed. To this mixture, 44 parts ammonium sulfate and 2.77 parts of a 2% solution of chelant ethylenediaminetetraacetic acid disodium salt (EDTA)were added and mixed. The pH of the mixture was about 3.3. The vessel was sealed and sparged with nitrogen for 30 minutes, and then polymerization was started by adding 2.48 parts of 2% aqueous solution of 2,2'-azobis(2-amidino-propane)dihydrochloride (V-50). The reaction mixture was heated at about 40° C. for 2 hours, then at about 50° C. for 4 hours, then cooled. A stable aqueous dispersion was obtained having a droplet size of about 5–15 microns. The bulk viscosity (BV) of the aqueous dispersion was about 3,160 centipoise (cps) showing preferable fluidity as measured with a Brookfield Viscometer, No. 4 spindle, 30 rpm at 25° C. The standard viscosity (SV) was about 2.34 cps.

EXAMPLES 4–5

Aqueous dispersions were prepared in the same general manner as Example 3, except that the AMPS level was varied as shown in Table 1.

EXAMPLES 6–7

Aqueous dispersions were prepared in the same general manner as Example 3, except that acrylic acid (AA) was used instead of AMPS as shown in Table 1.

TABLE 1

| No. | % AMD | % AETAC | % AMPS | % AA | BV (cps) |
| --- | --- | --- | --- | --- | --- |
| 1C | 60 | 40 | | | >200,000 |
| 2 | 55 | 40 | 5 | | >200,000 |
| 3 | 50 | 40 | 10 | | 3,160 |
| 4 | 45 | 40 | 15 | | 800 |
| 5 | 40 | 40 | 20 | | 400 |
| 6 | 45 | 40 | | 15 | 28,200 |
| 7 | 40 | 40 | | 20 | 25,900 |

EXAMPLE 8

A suitable vessel equipped with a mechanical stirrer, reflux condenser, and a nitrogen inlet tube was charged with 70.28 parts deionized water and 36.85 parts of a 40% aqueous solution of the polymer obtained by polymerizing the methyl chloride quaternary salt of dimethylaminoethylmethacrylate (poly(DMAEM.MeCl)), weight average molecular weight about 220,000. After completion of dissolution, 15.74 parts of a 53.76% aqueous solution of acrylamide (AMD), 28.84 parts of a 80% aqueous solution of acryloyloxyethyltrimethylammonium chloride (AETAC), and 3.08 parts of 2-acrylamido-2-methylpropanesulfonic acid (AMPS) and 3.22 parts of acrylic acid (AA) were added and mixed. To this mixture, 47.3 parts ammonium sulfate, 2.57 parts citric acid, 5.68 parts of a 1% lactic acid solution, and 2.65 parts of a 2% solution of chelant ethylenediaminetetraacetic acid disodium salt (EDTA) were added and mixed. The pH of the mixture was about 2.93. The vessel was sealed and sparged with nitrogen for 30 minutes, and then polymerization was started by adding 3.78 parts of 1% aqueous solution of 2,2'-azobis(2-amidino-propane) dihydrochloride (V-50). The reaction mixture was heated to about 40° C. for 2 hours, then 50° C. for 4 hours, then cooled. A stable aqueous dispersion was obtained having a droplet size of about 5–15 microns. The bulk viscosity (BV) of the aqueous dispersion was about 1,580 centipoise (cps) showing preferable fluidity as measured with a Brookfield Viscometer, No. 4 spindle, 30 rpm at 25° C. The standard viscosity (SV) was about 1.92 cps.

EXAMPLES 9–11

Aqueous dispersions were prepared in the same general manner as Example 8, showing the effect of various acrylic acid (AA) or methacrylic acid (MAA) levels on bulk viscosity as shown in Table 2.

TABLE 2

| No. | % AMD | % AETAC | % AMPS | % AA | % MAA | BV (cps) |
|---|---|---|---|---|---|---|
| 8 | 40 | 40 | 5 | 15 | | 1,580 |
| 9 | 45 | 40 | 5 | 10 | | 3,000 |
| 10 | 50 | 40 | 5 | 5 | | 5,240 |
| 11 | 50 | 40 | 5 | | 5 | 5,280 |

EXAMPLE 12C (Comparative)

A suitable vessel equipped with a mechanical stirrer, reflux condenser, and a nitrogen inlet tube was charged with 68.6 parts deionized water and 38.5 parts of a 40% aqueous solution of the polymer obtained by polymerizing the methyl chloride quaternary salt of dimethylaminoethylmethacrylate (poly(DMAEM.MeCl)), weight average molecular weight about 220,000. After completion of dissolution, 26.72 parts of a 52.6% aqueous solution of acrylamide (AM D), and 31.93 parts of a 80% aqueous solution of acryloyloxyethyltrimethylammonium chloride (AETAC) were added and mixed. To this mixture, 49.5 parts ammonium sulfate and 2.77 parts of a 2% solution of chelant ethylenediaminetetraacetic acid disodium salt were added and mixed. The pH of the mixture was about 3.2. The vessel was sealed and sparged with nitrogen for 30 minutes, and then polymerization was started by adding 2 parts of 2% aqueous solution of 2,2'-azobis(2-amidino-propane)dihydrochloride (V-50). The reaction mixture was heated to about 40° C. for 2 hours, then at about 50° C. for about 4 hours, then cooled. During the process of polymerization, the contents of the vessel became so viscous that the stirring became very difficult.

EXAMPLE 13

A suitable vessel equipped with a mechanical stirrer, reflux condenser, and a nitrogen inlet tube was charged with 72.6 parts deionized water and 38.5 parts of a 40% aqueous solution of the polymer obtained by polymerizing the methyl chloride quaternary salt of dimethylaminoethylmethacrylate (poly(DMAEM.MeCl)), weight average molecular weight about 220,000. After completion of dissolution, 19.21 parts of a 54.8% aqueous solution of acrylamide (AMD), and 31.89 parts of an 80% aqueous solution of acryloyloxyethyltrimethylammonium chloride (AETAC), and 3.56 parts acrylic acid (AA) were added and mixed. To this mixture, 49.5 parts ammonium sulfate and 2.77 parts of a 2% solution of chelant ethylenediaminetetraacetic acid disodium salt were added and mixed. The pH of the mixture was about 3.2. The vessel was sealed and sparged with nitrogen for 30 minutes, and then polymerization was started by adding 2 parts of 2% aqueous solution of 2,2'-azobis(2-amidino-propane)dihydrochloride (V-50). The reaction mixture was heated to about 40° C. for about 2 hours then to 50° C. for about 4 hours, then cooled. A stable aqueous dispersion was obtained having a droplet size of about 5–20 microns. The bulk viscosity (BV) of the aqueous dispersion was about 12,900 centipoise (cps) showing preferable fluidity as measured with a Brookfield Viscometer, No. 4 spindle, 30 rpm at 25° C. The standard viscosity (SV) of the aqueous dispersion was about 2.74 cps.

EXAMPLE 14

An aqueous dispersion was prepared in the same general manner as Example 13, except that the acrylic acid (AA) level was varied as shown in Table 3.

TABLE 3

| No. | % AMD | % AETAC | % AA | BV (cps) |
|---|---|---|---|---|
| 12C | 60 | 40 | | >200,000 |
| 13 | 45 | 40 | 15 | 12,900 |
| 14 | 40 | 40 | 20 | 7,950 |

EXAMPLES 15–16

Aqueous dispersions were prepared in the same general manner as Example 13, except that the AMPS and AA levels were varied as shown in Table 4.

TABLE 4

| No. | % AMD | % AETAC | % AMPS | % AA | BV (cps) |
|---|---|---|---|---|---|
| 15 | 45 | 40 | | 15 | 27,000 |
| 16 | 45 | 40 | 5 | 10 | 5,500 |

EXAMPLE 17C (Comparative)

A suitable vessel equipped with a mechanical stirrer, reflux condenser, and a nitrogen inlet tube was charged with 20.78 parts deionized water and 9.47 parts of a 53.76% aqueous solution of acrylamide (AMD), and 11.56 parts of a 80% aqueous solution of acryloyloxyethyltrimethylammonium chloride (AETAC) were added and mixed. To this mixture, 12.9 parts ammonium sulfate, 0.7 parts citric acid, and 1 parts of a 2% solution of chelant ethylenediaminetetraacetic acid disodium salt, and 2.15 parts of a 1% lactic acid were added and mixed. The pH of the mixture was about 3.2. The vessel was sealed and sparged with nitrogen for 30 minutes, and then polymerization was started by adding 1.43 parts of 1% aqueous solution of 2,2'-azobis(2-amidino-propane) dihydrochloride (V-50). The reaction mixture was heated to about 40° C. for 2 hours, then to about 50° C. for about 4 hours, then cooled. During the process of polymerization, the contents of the vessel became extremely difficult to stir. The product was not an aqueous dispersion.

EXAMPLE 18

A suitable vessel equipped with a mechanical stirrer, reflux condenser, and a nitrogen inlet tube was charged with 19.35 parts deionized water and 4.08 parts of a 53.76% aqueous solution of acrylamide (AMD), and 10.05 parts of a 40% aqueous solution of the polymer obtained by polymerizing the methyl chloride quaternary salt of dimethylaminoethylmethacrylate (poly(DMAEM.MeCl)), weight average molecular weight about 220,000. After completion of dissolution, 7.47 parts of a 80% aqueous solution of acryloyloxyethyltrimethylammonium chloride (AETAC), 1.6 parts of 2-acrylamido-2-methylpropanesulfonic acid (AMPS), and 0.56 parts of acrylic acid (AA) were added and mixed. To this mixture, 12.9 parts ammonium sulfate, 0.7 parts citric acid, 0.72 parts of a 2% solution of chelant ethylenediaminetetraacetic acid disodium salt, and 1.55 parts of a 1 % lactic acid were added and mixed. The pH of the mixture was about 2.6. The vessel was sealed and sparged with nitrogen for 30 minutes, and then polymerization was started by adding 1.43 parts of 1% aqueous solution of 2,2'-azobis(2-amidino-propane) dihydrochloride (V-50). The reaction mixture was heated to about 40° C. for about 2 hours, then at about 50° C. for about 4 hours, then cooled. The bulk viscosity (BV) of the resulting aqueous dispersion was about 780 centipoise (cps) showing preferable fluidity as measured with a Brookfield Viscometer, No. 4 spindle, 30 rpm at 25° C.

EXAMPLES 19–21

Aqueous dispersions were prepared in the same general manner as Example 18, except that the amounts of first and second polymer were varied as shown in Table 5.

TABLE 5

| No. | Wt. % First Polymer | Wt. % Second Polymer | Total Wt. % Polymer | BV (cps) |
|---|---|---|---|---|
| 17C | 23.9 | 0 | 23.9 | Not aqueous dispersion |
| 18 | 16.9 | 6.7 | 23.9 | 780 |
| 19 | 17.9 | 6.0 | 23.9 | 700 |
| 20 | 18.3 | 5.6 | 23.9 | 880 |
| 21 | 19.1 | 4.8 | 23.9 | 1160 |

EXAMPLES 22–25

Aqueous dispersions were prepared in the same general manner as Example 18, except that the molecular weight of the second polymer was 450,000. The effect on bulk viscosity of varying the amounts of first and second polymer is shown in Table 6.

TABLE 6

| No. | Wt. % First Polymer | Wt. % Second Polymer | Total Wt. % Polymer | BV (cps) |
|---|---|---|---|---|
| 22 | 18 | 7.0 | 25 | 860 |
| 23 | 18.7 | 6.3 | 25 | 940 |
| 24 | 19.3 | 5.7 | 25 | 940 |
| 25 | 20 | 5.0 | 25 | 940 |

EXAMPLE 26C (Comparative)

A suitable vessel equipped with a mechanical stirrer, reflux condenser, and a nitrogen inlet tube was charged with 73.8 parts deionized water and 26.4 parts of a 40% aqueous solution of the polymer obtained by polymerizing the methyl chloride quaternary salt of dimethylaminoethylmethacrylate (poly(DMAEM.MeCl)), weight average molecular weight about 450,000. After completion of dissolution, 27.79 parts of a 53.95% aqueous solution of acrylamide (AMD) and 34.06 parts of a 80% aqueous solution of acryloyloxyethyltrimethylammonium chloride (AETAC) were added and mixed. To this mixture, 49.5 parts ammonium sulfate, 2.57 parts citric acid, 2.96 parts of a 2% solution of chelant ethylenediaminetetraacetic acid disodium salt, and 0.84 parts of a 10% lactic acid solution were added and mixed. The pH of the mixture was about 3.5. The vessel was sealed and sparged with nitrogen for 30 minutes, and then polymerization was started by adding 2.11 parts of 2% aqueous solution of 2,2'-azobis(2-amidino-propane) dihydrochloride (V-50). The reaction mixture was heated to about 50° C. and then held for about 6 hours. During the process of polymerization, the contents of the vessel became so viscous that the stirring became extremely difficult.

EXAMPLE 27C (Comparative)

A suitable vessel equipped with a mechanical stirrer, reflux condenser, and a nitrogen inlet tube was charged with 73.8 parts deionized water and 26.4 parts of a 40% aqueous solution of the polymer obtained by polymerizing the methyl chloride quaternary salt of dimethylaminoethylmethacrylate (poly(DMAEM.MeCl)), weight average molecular weight about 450,000. After completion of dissolution, 25.57 parts of a 53.95% aqueous solution of acrylamide (AMD), 23.51 parts of an 80% aqueous solution of acryloyloxyethyltrimethylammonium chloride (AETAC), and 12.02 parts of a 80% aqueous solution of the dimethylsulfate quaternary salt of diethylaminoethylacrylate (DEAEA.DMS) were added and mixed. To this mixture, 49.5 parts ammonium sulfate, 2.57 parts citric acid, 2.96 parts of a 2% solution of chelant ethylenediaminetetraacetic acid disodium salt, and 0.84 parts of a 10% lactic acid solution were added and mixed. The pH of the mixture was about 3.5. The vessel was sealed and sparged with nitrogen for 30 minutes, and then polymerization was started by adding 2.11 parts of 2% aqueous solution of 2,2'-azobis(2-amidino-propane)dihydrochloride (V-50). The reaction mixture was heated to about 50° C. and then held for 6 hours. During the process of polymerization, the contents of the vessel became so viscous that the stirring became very difficult.

EXAMPLES 28–31

Aqueous dispersions were prepared in the same general manner as in Example 27C, except that various amounts of AMPS were substituted for AMD as shown in Table 7.

TABLE 7

| No. | % AMD | % AETAC | % DEAEA.DMS | % AMPS | BV (cps) |
|---|---|---|---|---|---|
| 26C | 60 | 40 | | | >200,000 |
| 27C | 60 | 30 | 10 | | >200,000 |
| 28 | 55 | 30 | 10 | 5 | 620 |
| 29 | 56 | 30 | 10 | 4 | 800 |
| 30 | 57 | 30 | 10 | 3 | 1,300 |
| 31 | 58.5 | 30 | 10 | 1.5 | 2,000 |

EXAMPLE 32

A suitable vessel equipped with a mechanical stirrer, reflux condenser, and a nitrogen inlet tube was charged with 75.65 parts deionized water and 26.4 parts of a 40% aqueous solution of the polymer obtained by polymerizing the methyl chloride quaternary salt of dimethylaminoethylmethacrylate (poly(DMAEM.MeCl)), weight average molecular weight about 450,000. After completion of dissolution, 24.28 parts of a 53.57% aqueous solution of acrylamide (AMD), 32.24 parts of an 80% aqueous solution of acryloyloxyethyltrimethylammonium chloride (AETAC), and 3.45 parts of 2-acrylamido-2-methylpropanesulfonic acid (AMPS) were added and mixed. To this mixture, 49.5 parts ammonium sulfate, 2.57 parts citric acid, and 2.96 parts of a 2% solution of chelant ethylenediaminetetraacetic acid disodium salt (EDTA) were added and mixed. The pH of the mixture was about 2.9. The vessel was sealed and sparged with nitrogen for 30 minutes, and then polymerization was started by adding 2.11 parts of 2% aqueous solution of 2,2'-azobis(2-amidino-propane) dihydrochloride (V-50). The reaction mixture was heated to about 50° C. and then held for about 5 hours. During the process of polymerization, the contents of the vessel became very viscous. The resulting aqueous dispersion had a bulk viscosity that was estimated to be greater than about 200,000 cps.

EXAMPLE 33

A suitable vessel equipped with a mechanical stirrer, reflux condenser, and a nitrogen inlet tube was charged with 77.53 parts deionized water and 26.4 parts of a 40% aqueous solution of the polymer obtained by polymerizing the methyl chloride quaternary salt of dimethylaminoethylmethacrylate (poly(DMAEM.MeCl)), weight average molecular weight about 450,000. After completion of dissolution, 20.95 parts of a 53.57% aqueous solution of acrylamide (AMD), 30.6 parts of an 80% aqueous solution of acryloyloxyethyltrimethylammonium chloride (AETAC), and 6.54 parts of 2-acrylamido-2-methylpropanesulfonic acid (AMPS) were added and mixed. To this mixture, 49.5 parts ammonium sulfate, 2.57 parts citric acid, and 2.96 parts of a 2% solution of chelant ethylenediaminetetraacetic acid disodium salt (EDTA) were added and mixed. The pH of the mixture was about 2.7. The vessel was sealed and sparged with nitrogen for 30 minutes, and then polymerization was started by adding 2.11 parts of 2% aqueous solution of 2,2'-azobis(2-amidino-propane) dihydrochloride (V-50). The reaction mixture was heated to about 50° C. and then held for about 5 hours. An aqueous dispersion having a droplet size of about 5–15 microns was obtained. The bulk viscosity (BV) of the aqueous dispersion was about 940 centipoise (cps) showing preferable fluidity as measured with a Brookfield Viscometer, No. 4 spindle, 30 rpm at 25° C. The aqueous dispersion had a standard viscosity (SV) of about 3.24 cps.

EXAMPLE 34

A suitable vessel equipped with a mechanical stirrer, reflux condenser, and a nitrogen inlet tube was charged with 66.17 parts deionized water and 33 parts of a 32% aqueous solution of the polymer obtained by polymerizing the methyl chloride quaternary salt of dimethylaminoethylmethacrylate (poly(DMAEM.MeCl)), weight average molecular weight about 450,000. After completion of dissolution, 24.96 parts of a 52.11% aqueous solution of acrylamide (AMD), 32.24 parts of a 80% aqueous solution of acryloyloxyethyltrimethylammonium chloride (AETAC), and 3.45 parts of 2-acrylamido-2-methylpropanesulfonic acid (AMPS) were added and mixed. To this mixture, 49.5 parts ammonium sulfate, 2.57 parts citric acid, 2.96 parts of a 2% solution of chelant ethylenediaminetetraacetic acid disodium salt (EDTA), 0.84 parts of a 10% lactic acid, and 2.2 parts tertiary butyl alcohol (t-BuOH) (bulk viscosity-reducing additive) were added and mixed. The pH of the mixture was about 3.0. The vessel was sealed and sparged with nitrogen for 30 minutes, and then polymerization was started by adding 2.11 parts of 2% aqueous solution of 2,2'-azobis(2-amidino-propane) dihydrochloride (V-50). The reaction mixture was heated to about 50° C. and then held for about 5 hours. An aqueous dispersion having a droplet size of about 5–20 microns was obtained. The bulk viscosity (BV) of the aqueous dispersion was about 9,100 centipoise (cps) showing preferable fluidity as measured with a Brookfield Viscometer, No. 4 spindle, 30 rpm at 25° C. The standard viscosity (SV) was about 2.7 cps.

EXAMPLE 35

An aqueous dispersion was prepared in the same general manner as Example 34, except that a greater amount of tertiary butyl alcohol (t-BuOH) was added as a bulk viscosity-reducing additive as shown in Table 8.

TABLE 8

| No. | % AMD | % AETAC | % AMPS | % t-BuOH | BV (cps) |
|---|---|---|---|---|---|
| 32 | 55 | 40 | 5 | 0 | >200,000 |
| 33 | 50 | 40 | 10 | 0 | 940 |
| 34 | 55 | 40 | 5 | 1 | 9,100 |
| 35 | 56 | 40 | 5 | 1.5 | 4,400 |

EXAMPLE 36

A suitable vessel equipped with a mechanical stirrer, reflux condenser, and a nitrogen inlet tube was charged with 66.17 parts deionized water and 33 parts of a 32% aqueous solution of the polymer obtained by polymerizing the methyl chloride quaternary salt of dimethylaminoethylmethacrylate (poly(DMAEM.MeCl)), weight average molecular weight about 450,000. After completion of dissolution, 24.96 parts of a 52.11% aqueous solution of acrylamide (AMD), 32.24 parts of a 80% aqueous solution of acryloyloxyethyltrimethylammonium chloride (AETAC), and 3.45 parts of 2-acrylamido-2-methylpropanesulfonic acid (AMPS) were added and mixed. To this mixture, 49.5 parts ammonium sulfate, 2.57 parts citric acid, 2.96 parts of a 2% solution of chelant ethylenediaminetetraacetic acid disodium salt (EDTA), 0.84 parts of a 10% lactic acid solution, and 2.2 parts tertiary butyl alcohol (t-BuOH) (bulk viscosity-reducing additive) were added and mixed. The pH of the mixture was about 3.0. The vessel was sealed and sparged with nitrogen for 30 minutes, and then polymerization was started by adding 2.11 parts of 2% aqueous solution of 2,2'-azobis(2-amidino-propane) dihydrochloride (V-50). The reaction mixture was heated to about 50° C. and then held for about 5 hours without stirring. A aqueous dispersion having a droplet size of about 5-20 microns was obtained. The bulk viscosity (BV) of the aqueous dispersion was about 8,920 centipoise (cps) showing preferable fluidity as measured with a Brookfield Viscometer, No. 4 spindle, 30 rpm at 25° C. The standard viscosity (SV) was about 2.6 cps. This Example demonstrates the preparation of an aqueous dispersion with little or no stirring during polymerization.

EXAMPLE 37

A suitable vessel equipped with a mechanical stirrer, reflux condenser, and a nitrogen inlet tube was charged with 252.3 parts deionized water and 126 parts of a 32% aqueous solution of the polymer obtained by polymerizing the methyl chloride quaternary salt of dimethylaminoethylmethacrylate (poly(DMAEM.MeCl)), weight average molecular weight about 450,000. After completion of dissolution, 94.4 parts of a 52.6% aqueous solution of acrylamide (AMD), 123.08 parts of a 80% aqueous solution of acryloyloxyethyltrimethylammonium chloride (AETAC), and 13.16 parts of 2-acrylamido-2-methylpropanesulfonic acid (AMPS) were added and mixed. To this mixture, 189 parts ammonium sulfate, 10.25 parts citric acid, 16.13 parts of a 2% solution of chelant ethylenediaminetetraacetic acid disodium salt (EDTA), 3.23 parts of a 10% lactic acid solution, and 8.39 parts tertiary butyl alcohol (t-BuOH) (bulk viscosity-reducing additive) were added and mixed. The pH of the mixture was about 3.2. The vessel was sealed and sparged with nitrogen for 30 minutes, and then polymerization was started by adding 4.03 parts of 2% aqueous solution of 2,2'-azobis(2-amidino-propane) dihydrochloride (V-50).

The reaction mixture was heated to 50° C. and then held for 5 hours with a constant stirring rate of 350 rpm. An aqueous dispersion having a droplet size of about 1–20 microns was obtained. The bulk viscosity (BV) of the aqueous dispersion was about 3,700 centipoise (cps) showing preferable fluidity as measured with a Brookfield Viscometer, No. 4 spindle, 30 rpm at 25° C. The standard viscosity (SV) was about 3.0 cps.

EXAMPLE 38

An aqueous dispersion was prepared in the same general manner as Example 37 except that glycerol was used in place of tertiary butyl alcohol (t-BuOH) as a bulk viscosity-reducing additive and no lactic acid was used. The resulting aqueous dispersion had a bulk viscosity (BV) of about 32,000 cps as measured with a Brookfield Viscometer, No. 4 spindle, 30 rpm at 25° C. The standard viscosity (SV) was about 2.7 cps.

EXAMPLE 39

A suitable vessel equipped with a mechanical stirrer, reflux condenser, and a nitrogen inlet tube was charged with 256.68 parts deionized water and 126 parts of a 32% aqueous solution of the polymer obtained by polymerizing the methyl chloride quaternary salt of dimethylaminoethylmethacrylate (poly(DMAEM.MeCl)), weight average molecular weight about 450,000. After completion of dissolution, 92.27 parts of a 52.6% aqueous solution of acrylamide (AMD), 122.54 parts of a 80% aqueous solution of acryloyloxyethyltrimethylammonium chloride (AETAC), 13.1 parts of 2-acrylamido-2-methylpropanesulfonic acid (AMPS), and 1.61 parts tertiary butyl acrylamide (t-BuAMD) were added and mixed. To this mixture, 189 parts ammonium sulfate, 10.25 parts citric acid, 16.13 parts of a 2% solution of chelant ethylenediaminetetraacetic acid disodium salt (EDTA), and 8.39 parts glycerol were added and mixed. The pH of the mixture was about 2.5. The vessel was sealed and sparged with nitrogen for 30 minutes, and then polymerization was started by adding 4.03 parts of 2% aqueous solution of 2,2'-azobis(2-amidino-propane) dihydrochloride (V-50). The reaction mixture was heated to 50° C. and then held for 5 hours with a constant stirring rate of 350 rpm. The bulk viscosity (BV) of the resulting aqueous dispersion was about 8,500 centipoise (cps) showing preferable fluidity as measured with a Brookfield Viscometer, No. 4 spindle, 30 rpm at 25° C. The standard viscosity (SV) was about 2.8 cps. This experiment shows the effect of incorporating both a bulk viscosity-reducing amount of a hydrophobic recurring unit (t-BuAMD) and a bulk viscosity-reducing additive (glycerol) into an aqueous dispersion.

EXAMPLES 40–47

Various amounts of either ammonium sulfate, 1,3-benzenedisulfonate (1,3-BDS), or sodium thiocyanate (NaSCN) were added to 50 gram samples of the base aqueous dispersion of Example 37. The bulk viscosities of the resultant aqueous dispersions were reduced as shown in Table 9. These examples demonstrate that the bulk viscosity of an aqueous dispersion may be reduced by adding bulk viscosity-reducing amounts of salt, and that the addition of chaotropic salt e.g. NaSCN, or anionic organic salt e.g. 1,3-BDS, may be more effective than ammonium sulfate on a weight basis. Substantially similar results are obtained by polymerizing the monomers in the presence of the salts.

TABLE 9

| No. | Added Salt | Amount of Added Salt, grams | BV, cps |
| --- | --- | --- | --- |
| 40 | $(NH_4)_2SO_4$ | 0 | 3740 |
| 41 | $(NH_4)_2SO_4$ | 1 | 2400 |
| 42 | $(NH_4)_2SO_4$ | 2 | 1800 |
| 43 | $(NH_4)_2SO_4$ | 3 | 1250 |
| 44 | 1,3-BDS | 0.5 | 1870 |
| 45 | 1,3-BDS | 1 | 1000 |
| 46 | NaSCN | 0.5 | 1340 |
| 47 | NaSCN | 1 | 1120 |

EXAMPLES 48–65

The performance of the aqueous dispersions of the instant invention was determined by measuring free drainage rate and cake solids from dewatered sludge as follows: two hundred grams of sewage sludge from a municipal waste treatment plant were weighted into each of a series of jars. Solutions of the aqueous dispersions of Example 28 and 31 were prepared so that the concentration of the polymer was about 0.2%. Control samples were also prepared from commercial water-in-oil polymer emulsions (Polymer A: 60/40 mole % AMD/AETAC; Polymer B: 65/35 mole % AMD/AETAC), so that the concentration of the polymer was also about 0.2%. Various doses of the polymer solutions were intermixed with the sludge samples and agitated at 1000 rpm for 5 seconds (1000 rpm/5 seconds) with an overhead mixer. The resultant aqueous mixture of flocculated sludge was dewatered by pouring it into a Buchner funnel containing a 35 mesh stainless steel screen; the free drainage was determined by measuring the milliliters of filtrate collected in 10 seconds. Cake solids were determined by drying the pressed sludge at 105° C. The results are shown in Table 10, with the polymers of the invention being identified by previous Example No., free drainage in units of millimeters/10 seconds, dosage in units of pounds of real polymer per ton of dry sludge, and cake solids as a weight percent of dry solids in wet cake. A "C" after the Example Number in Table 10 indicates a control. These Examples show that the performance of the aqueous dispersions of the instant invention is subtantially equivalent or superior to comparable commercial products.

TABLE 10

| No. | Polymer | Dosage lb/DT | Free Drainage | Cake Solids, % |
| --- | --- | --- | --- | --- |
| 48 | Ex. 31 | 17.2 | 135 | 18.45 |
| 49 | Ex. 31 | 19.4 | 130 | 18.56 |
| 50 | Ex. 31 | 21.5 | 116 | 18.65 |
| 51 | Ex. 31 | 22.6 | 115 | 19.47 |
| 52 | Ex. 31 | 23.7 | 112 | 19.03 |
| 53 | Ex. 28 | 19.4 | 122 | 18.88 |
| 54 | Ex. 28 | 21.5 | 126 | 19.13 |
| 55 | Ex. 28 | 22.6 | 124 | 18.77 |
| 56 | Ex. 28 | 23.7 | 122 | 19.08 |
| 57 | Ex. 28 | 25.8 | 117 | 19.12 |
| 58C | Polymer A | 19.4 | 130 | 17.69 |
| 59C | Polymer A | 21.5 | 123 | 18.61 |
| 60C | Polymer A | 22.6 | 129 | 17.63 |
| 61C | Polymer A | 23.7 | 130 | 17.99 |
| 62C | Polymer B | 19.4 | 94 | 17.54 |
| 63C | Polymer B | 21.5 | 126 | 16.56 |
| 64C | Polymer B | 22.6 | 123 | 16.84 |
| 65C | Polymer B | 23.7 | 127 | 16.22 |

We claim:

1. A composition comprising an aqueous dispersion comprised of (a) a first cationic water-soluble or water-swellable polymer comprised of cationic recurring units and from about 1.5% to about 30% of anionic recurring units, by mole based on said cationic recurring units; and (b) at least one second water-soluble polymer different from said first polymer, wherein the amounts of said (a) and said (b) are such that a homogeneous composition is obtained in the absence of said (b), and wherein said composition is further comprised of from about 3% to about 35% of a kosmotropic salt, by weight based on total weight of said aqueous dispersion.

2. A composition as claimed in claim 1, wherein said second polymer is a cationic vinyl-addition polymer.

3. A composition as claimed in claim 1, which is comprised of from about 5% to about 35% of said kosmotropic salt, by weight based on total weight of said aqueous dispersion.

4. A composition as claimed in claim 1, wherein said anionic recurring units are selected from the group consisting of acrylic acid, methacrylic acid, ethacrylic acid, maleic acid, itaconic acid, 2-acrylamido-2-methylpropanesulfonic acid, vinylsulfonic acid, vinylsulfuric acid, vinylphosphonic acid, styrenesulfonic acid, styrenesulfuric acid, and ammonium and alkali metal salts thereof.

5. A composition as claimed in claim 1, wherein said cationic recurring units are of the formula (I),

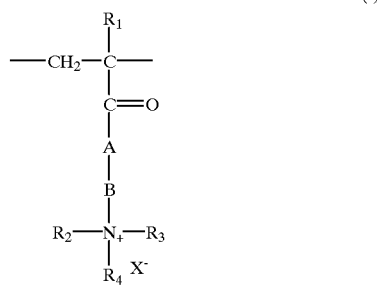

wherein $R_1$ is H or $CH_3$, A is O or NH, B is an alkylene or branched alkylene or oxyalkylene group having from 1 to 5 carbons, $R_2$ is a methyl, ethyl, or propyl group, $R_3$ is a methyl, ethyl, or propyl group, $R_4$ is an alkyl group having from 1 to 10 carbons, or an aryl group having from 6 to 10 carbons, and X is a counterion.

6. A composition as claimed in claim 1, wherein said first polymer is further comprised of non-ionic recurring units.

7. A composition as claimed in claim 1, wherein said anionic recurring units are present in a dispersion-creating amount.

8. A composition as claimed in claim 1, wherein said anionic recurring units are present in an amount effective to reduce the bulk viscosity of said aqueous dispersion as compared to a comparable aqueous dispersion in which said first polymer contains acrylamide recurring units in place of said anionic recurring units.

9. A composition as claimed in claim 1 which is further comprised of a bulk viscosity-reducing additive.

10. An aqueous dispersion comprised of (a) a first cationic water-soluble polymer comprised of cationic recurring units and anionic recurring units; and (b) at least one second water-soluble cationic vinyl-addition polymer different from said first polymer, wherein the amounts of said (a) and said (b) are such that a homogeneous composition is obtained in the absence of said (b); wherein said cationic recurring units are selected from the group consisting of (meth)acryloyloxyethyltrimethylammonium chloride, (meth)acryloyloxyethyltrimethylammonium methylsulfate, (meth)acryloyloxyethyl-diethylmethylammonium chloride, (meth)acryloyloxyethyldiethylmethylammonium methylsulfate, (meth)acryloyloxyethyldimethylbenzylammonium chloride, and (meth)acryloyloxyethyldimethylbenzylammonium methylsulfate; wherein said anionic recurring units are selected from the group consisting of acrylic acid, methacrylic acid, ethacrylic acid, 2-acrylamido-2-methylpropanesulfonic acid, styrenesulfonic acid, and ammonium and alkali metal salts thereof; wherein said anionic recurring units are present in an amount of from about 1.5% to about 30%, by mole based on moles of said cationic recurring units in said first polymer, and wherein said composition is further comprised of from about 3% to about 35% of a kosmotropic salt, by weight based on total weight of said aqueous dispersion.

11. An aqueous dispersion as claimed in claim 10 which is comprised of from about 5% to about 35% of said kosmotropic salt, wherein said kosmotropic salt is selected from the group consisting of chlorides, sulfates, phosphates, and hydrogenphosphates, by weight based on total weight of said aqueous dispersion.

* * * * *